US012631600B2

(12) United States Patent
Fernández Díaz et al.

(10) Patent No.: US 12,631,600 B2
(45) Date of Patent: May 19, 2026

(54) DEVICE AND METHOD FOR IMPROVING THE STABILITY AND DETECTION LIMIT OF ACOUSTIC WAVE SENSORS

(71) Applicant: ADVANCED WAVE SENSORS, S.L., Valencia (ES)

(72) Inventors: Román Fernández Díaz, Picanya (ES); María Calero Alcarria, Castellón de la Plana (ES); José Vicente García Narbón, Burjassot (ES); Yolanda Jimenez Jimenez, Valencia (ES); Antonio Arnau Vives, Valencia (ES)

(73) Assignee: ADVANCED WAVE SENSORS, S.L., Valencia (ES)

( * ) Notice: Subject to any disclaimer, the term of this patent is extended or adjusted under 35 U.S.C. 154(b) by 326 days.

(21) Appl. No.: 18/556,446

(22) PCT Filed: Mar. 28, 2022

(86) PCT No.: PCT/ES2022/070177
§ 371 (c)(1),
(2) Date: Oct. 20, 2023

(87) PCT Pub. No.: WO2022/223857
PCT Pub. Date: Oct. 27, 2022

(65) Prior Publication Data
US 2024/0068994 A1 Feb. 29, 2024

(30) Foreign Application Priority Data
Apr. 21, 2021 (ES) .................................. P202130351

(51) Int. Cl.
*G01N 29/46* (2006.01)
*G01N 29/02* (2006.01)
(Continued)

(52) U.S. Cl.
CPC ........... *G01N 29/46* (2013.01); *G01N 29/022* (2013.01); *G01N 29/036* (2013.01); *G01N 29/4436* (2013.01)

(58) Field of Classification Search
CPC .... G01N 29/46; G01N 29/022; G01N 29/036; G01N 29/4436; G01N 29/032; G01N 29/222; G01N 29/4472; G01G 3/147
See application file for complete search history.

(56) References Cited

FOREIGN PATENT DOCUMENTS

WO 2004005907 A1 1/2004

OTHER PUBLICATIONS

International Search Report issued Jul. 15, 2022, in corresponding International Application No. PCT/ES2022/070177, 15 pages.
(Continued)

*Primary Examiner* — Tarun Sinha
(74) *Attorney, Agent, or Firm* — Maier & Maier, PLLC

(57) ABSTRACT

A device and method for real-time measurement using acoustic wave sensors, without the measurement being altered by environmental conditions such as temperature, humidity, flow or pressure, and without requiring the use of external gauges. The proposed method and device improve the stability and detection limit of quartz crystal microbalance (QCM) sensors. The method and device are based on the high degree of correlation between acoustic resonators integrated into a single piezoelectric substrate. The use of a reference sample to correct the instability of the baseline is not required. The method and device are intended for the industrial sector of the production of measuring devices based on quartz crystals.

7 Claims, 6 Drawing Sheets

(51) Int. Cl.
   *G01N 29/036*     (2006.01)
   *G01N 29/44*     (2006.01)

(56)           References Cited

OTHER PUBLICATIONS

Liang et al. "Development of a Flow Injection Based High Frequency Dual Channel Quartz Crystal Microbalance". Sensors, vol. 17, Article 1136. May 2017, 9 pages.

Zhang et al. "Design and evaluation of a dual channel high frequency Quartz crystal Microbalance", 10th International Conference on Sensing Technology (ICST), Nov. 11, 2016, 5 pages.

Tonda-Turo et al. "Quartz Crystal Microbalance With Dissipation Monitoring: A Powerful Method to Predict the in vivo Behavior of Bioengineered Surfaces". Frontiers in Bioengineering and Biotechnology, vol. Jun. 2018, Oct. 30, 2018, 15 pages.

DEVICE AND METHOD FOR IMPROVING THE STABILITY AND DETECTION LIMIT OF ACOUSTIC WAVE SENSORS

FIELD

Intended for the industrial sector manufacturer of measuring devices based on quartz crystals.

BACKGROUND

Acoustic resonators, including those based on piezoelectric quartz crystals, are devices that are used to accurately measure both variations in mass per unit area and the viscoelastic properties and conformational changes of the media deposited on them, through changes in the complex resonance frequency of these crystals operating as resonators.

These devices are ideal for monitoring physicochemical processes in situ, but environmental conditions such as temperature, humidity, pressure, flow velocity can produce drifts and variations in the sensor response. For this reason, it is necessary to keep constant all those factors that could affect the stability of the sensor by masking the signals of interest. This is not an easy task, and it tends to increase the complexity and cost of the test devices, often preventing the development of lightweight and portable instruments that can be used in applications outside the laboratory.

For example, in the case of temperature, active thermal control systems are used, usually based on the inclusion of thermoregulatory elements, such as Peltier cells, to control the temperature of the sample and the sensor during the experiment.

Numerous authors have tried to find alternative solutions to the use of expensive and complex control systems. One of the first approaches was based on the use of two resonators, one of which is used as a reference (Mecea, V. M.; Carlsson, J. O.; Heszler, P.; Bârtan, M. Development and Testing of a High 691-TemperatureQuartzCrystalMicrobalance. Vacuum 1995, 46 (7), 694.https://doi.org/10.1016/0042-207X(94) 00147-2).

By subtracting the frequency variations of both resonators, it is possible to cancel the effect of temperature fluctuations on the measurement. This procedure works well when two conditions are met: that the temperature is equal in both resonators and that the response of both resonators to temperature coincides. These two conditions are not always met. In case of applying this procedure, a proper thermal design of the instrument and also of the resonators is necessary.

Rahtu et. al. (Rahtu, A.; Ritala, M. Compensation of Temperature Effects in Quartz Crystal Microbalance Measurements. Appl. Phys. Lett. 2002, 80 (3), 521-523. https://doi.org/10.1063/1.1433904) compare the performance of the above procedure with an alternative approach based on modeling the frequency variation produced by temperature changes by a third degree polynomial. From a numerical fit of the experimental data to such a model, the thermal effects are corrected for without the need to include an additional sensor to serve as a reference. The results obtained with this procedure are comparable to those obtained using the reference sensor. This approach is only valid for monotonic temperature variations and may have convergence problems for experiments with a long duration (more than 15 minutes). In addition, it is necessary to include a temperature sensor in the device.

Other authors (Pierce, D. E. A TemperatureInsensitiveQuartzMicrobalance. IEEE Trans. Ultrason. Ferroelectr. Freq. Control 1998, 45 (5), 1238-1245. https://doi.org/10.1109/58.726449) propose to cancel the temperature effect by employing SC-cut quartz acoustic resonators. These resonators are specifically designed to compensate their response to mechanical stress and their response to temperature does not depend on the rate of temperature variation. By simultaneously measuring two harmonic modes of the resonator and assuming a gravimetric working regime, it is possible to calibrate the temperature response of the crystal without the need for an external thermometer. The main disadvantage of SC shear resonators is their higher cost due to the complex double rotation process required for their fabrication. Also, thermal compensation based on this procedure does not apply to dissipation measurements or to experiments where the thickness of the layer deposited on the sensor or its viscoelastic or hydrodynamic properties do not ensure a gravimetric working regime.

In addition to temperature, other factors such as pressures and mechanical stresses due to the measuring cell, aging of the resonator, external vibrations, non-specific surface adsorption, presence of impurities or dislocations in the quartz or humidity can affect the stability of the resonance frequency and the quality factor, hindering the measurement and degrading the detection limit of the technique.

In these cases, the state of the art refers to different procedures that try to correct the drift in a "blind" way, independently of the mechanism that produces it in individual sensors. Most of them are based on the calibration of the sensor from a reference sample that is used to compensate the baseline by applying an additive or multiplicative correction a posteriori. These procedures cannot be applied in real time and introduce the need for a calibration phase in the measurement. Other procedures are based on frequency analysis to filter out from the signal of interest the components due to electronic noise or drifts by applying averaging, smoothing or filtering. They usually work well to reduce high frequency fluctuations (noise), but do not give good results in the case of low frequency signals (drift), whose spectrum usually overlaps with the components of interest, making filtering difficult.

Other authors have proposed the use of statistical tools to improve frequency stability. One of these procedures is known as Principal Component Analysis (PCA). It is based on the dimensional reduction of a large data set to highlight its most statistically significant components, which ideally relate to the signals of interest, while eliminating the less significant components, which could be associated with frequency instability. Recently, the PCA procedure has been used to improve the detection limit (Corradi, E.; Agostini, M.; Greco, G.; Massidda, D.; Santi, M.; Calderisi, M.; Signore, G.; Cecchini, M. An Objective, Principal-Component-Analysis (PCA) Based, Method Which Improves the Quartz-Crystal-Microbalance (QCM) Sensing Performance. Sensors Actuators, A Phys. 2020, 315, 112323. https://doi.org/10.1016/j.sna.2020.112323) of acoustic sensors in multi-harmonic measurements. Assuming a gravimetric working regime, the measurements of all modes are reduced to a single measurement with an improved detection limit. The combined use of PCA and neural networks to eliminate the effect of humidity on toluene gas measurement has also been reported (Mumyakmaz, B.; Özmen, A.; Ebeoğlu, M. A.; Taşaltin, C.; Gürol, I. A Studyon the Developmentof a Compensation Method forHumidityEffect in QCM Sensor Responses.

Sensors Actuators, B Chem. 2010, 147 (1) 277-282. https://doi.org/10.1016/j.snb.2010.03.019) performed by an array of QCM sensors. Due to their high computational cost, these PCA-based statistical procedures are usually used for measurement classification and not for real-time signal correction. There are therefore no known inventions and procedures that advantageously solve the technical problem as the advocated invention.

SUMMARY

To provide a device and procedure for measurement by acoustic wave sensors that allow real-time measurement and offer improved frequency stability. To provide a measurement that is not altered by environmental conditions. To obtain a procedure and device of lower complexity and cost.

The present invention proposes a procedure and a device for improving the stability and limit of detection (LoD) of quartz crystal microbalances also called QCM sensors, solving one or more of the drawbacks exposed above.

The procedure exploits the high degree of correlation between two acoustic resonators integrated in the same piezoelectric substrate (Monolithic Quartz Crystal Microbalance, MQCM) subjected to similar environmental conditions (temperature, humidity, flow, pressure, . . . ). One of the resonators, which we will call sensor, is placed in contact with the sample to be analyzed while the other, which we will call reference, is kept isolated from it. Both resonators should ideally be in close proximity.

We will call x(t) the time domain signal (either resonance frequency or dissipation) measured at the sensor and y(t) the same time domain signal measured at the reference resonator. The result provided by this procedure will be a corrected signal which we will call z(t), with an improvement in its stability with respect to the sensor signal x(t), both for long (drift) and short (noise) integration times.

The proposed procedure is able to eliminate from the measurement the factors common to both resonators, which are related to external factors external to the sample. In this way, the impact of environmental conditions on the stability of the measurement is minimized, both at short integration times (noise) and at long times (drifts). Since it is based on a differential analysis that measures the temporal correlation between the reference signal and the sensor signal, it is very robust to small differences in the absolute response of the resonators to the external magnitude(s) that are affecting the measurement.

The procedure provides a real-time measurement for the simultaneous characterization of an array of QCM sensors integrated on a monolithic substrate during the monitoring of a chemical or physical process whose outcome can be evaluated in terms of mass variation and/or modification of the geometrical, hydrodynamic or viscoelastic properties of a coating deposited on a piezoelectric sensor facing a fluid or gaseous medium. The procedure can also be applied in the characterization of different harmonic modes of resonance in the same acoustic resonator (integrated in an MQCM sensor array) during such an experimental process.

The application of the procedure does not require the use of external gauges to determine humidity, temperature, pressure, vibration, etc. It corrects not only one of these factors but the simultaneous effect of all of them on the sensor response. The calculations necessary for its implementation have a reduced computational cost, being able to be performed by a low-cost microprocessor in real time.

The procedure works both for the gravimetric regime and for experiments where viscoelastic or hydrodynamic properties are not negligible.

The proposed procedure does not require the use of a reference sample for the correction of line base instabilities.

During the analysis, the device implementing the procedure monitors the resonance frequency and dissipation factor of both resonators in real time. The device comprises:
    a mechanical and electronic interface where a monolithic array composed of a set of several QCM sensors can be easily inserted;
    a microfluidic system that allows the sample to be dispensed onto the surface of the sensors and isolates the sample from the electrical contacts of the resonators;
    a frequency-determined signal source with high frequency stability and low phase noise that provides a signal between 1 and 300 MHz;
    a frequency synthesis subsystem;
    a multiplexing subsystem that allows the excitation/interrogation of a particular resonator of the array;
    a signal conditioning and acquisition subsystem;
    a thermal control subsystem that allows the array temperature to be varied between 0 and 70° C.
    a control subsystem based on the use of digital integrated circuits that allows the coordinated control of the different subsystems that make up the device.
    A processing subsystem consisting of a floating point calculation unit and the memory units necessary to store the calculation results. This subsystem is capable of calculating the dynamic series frequency and dissipation factor of the piezoelectric resonator being interrogated from the data provided by the acquisition subsystem.

The procedure characterizes the resonant response of a sensor, the resonant frequency and the losses (Quality factor), and comprises the following operations:
    1. Measurement, with a sampling period of between 0.01 and 1 second, of the resonant frequency and losses (Quality factor) of the resonators (sensor and reference) by means of the device referred to above, capable of monitoring the electrical admittance of a set of QCM sensors monolithically integrated on a common quartz substrate in AT cut.
    2. Inject the sample on the surface of the resonator acting as a sensor with a flow rate between 1 and 200 µl/min.
    3. Apply the Daubechies type wavelet transform of level 2 or higher to the time signals x(t) and y(t). This transform will generate several series of coefficients (components) for each signal: an approximation component and as many detail components as levels, I, have been configured. This series of coefficients will be calculated in the processing subsystem of the device and stored in its memory. The nomenclature we will use to refer to these components of the wavelet transform will be $X_A(n)$, $X_{D1}(n)$, $X_{D2}(n)$, . . . , $X_{Dl}(n)$ for the sensor signal components and $Y_A(n)$, $Y_{D1}(n)$, $Y_{D2}(n)$, . . . , $Y_{Dl}(n)$ for the reference signal components. In the transformed domain, n indicates the sample number. Each of these components captures the behavior of the signal in a certain sector of the time-frequency domain and has a different length.
    4. To apply a process in which all the wavelet components whose magnitude is lower than a certain threshold, which we will call Th, will be eliminated because they do not make a significant contribution to the total energy of the signal, or because they present Gaussian random noise characteristics. The components treated with the threshold Th are denoted $\hat{X}_A(n)$, $\hat{X}_{D1}(n)$, $\hat{X}_{D2}(n)$, ..., $\hat{X}_{Dl}(n)$ for the sensor and $\hat{Y}_A(n)$, $Y_{D1}(n)$, $\hat{Y}_{D2}(n)$, ..., $\hat{Y}_{Dl}(n)$ for the reference. These components are calculated in the processing subsystem of the device and stored in its memory. This procedure contributes significantly to remove high-frequency noise from the resonance and dissipation frequency signal acquired by the device.

5. Compute the numerical derivative of the components treated with the threshold Th which we will refer to as $\hat{X}'_A(n)$, $\hat{X}'_{D1}(n)$, $\hat{X}'_{D2}(n)$, ..., $\hat{X}'_{D1}(n)$ for the sensor and $\hat{Y}'_A(n)$, $Y'_{D1}(n)$, $\hat{Y}'_{D2}(n)$, ..., $\hat{Y}'_{Dl}(n)$ for the reference. These derivatives are computed in the processing subsystem of the device and stored in its memory. The procedure assumes that, although the absolute values of the magnitude of the components may differ, the time variations of the components are linearly correlated in the case that they are due to factors common to the two resonators.

6. Calculate the correlation coefficient R between each sample n of each of the derivatives of the components treated with the sensor threshold Th and its counterpart in the reference resonator signal. A window of w samples around each sample n is considered for the calculation. From the correlation coefficient R, the consigned P value that establishes whether the hypothesis of no correlation is statistically significant will also be obtained. These calculations are performed in the processing subsystem of the device and their results are stored in its memory.

7. Calculate the corrected time derivative of the Wavelet transform components of the new corrected signal z(t), which we refer to as $Z'_A(n)$, $Z'_{D1}(n)$, $Z'_{D2}(n)$, ..., $Z'_{Dl}(n)$ If the components are statistically significantly related (P<5%), the new derivative of the corrected component is calculated as:

$$Z'_K(n)=X'_K(n)-a-bY'_K(n)$$

Where k=A,D1,D2, ..., DI already, b being the coefficients that minimize the linear fit between $X'_K e Y'_K$ in the w sample window centered on sample n. If the calculated correlation coefficient does not indicate a high correlation probability (P>5%), %), the new corrected component derivative is calculated as:

$$Z'_K(n)=X'_K(n)-Y'_K(n)$$

These calculations are performed in the processing subsystem of the device and their results are stored in its memory.

8. Reconstruction of the Wavelet coefficients of the corrected signal z(t),Z_A (n),Z_D1 (n),Z_D2 (n), ..., Z_DI (n). by means of numerical integration. This calculation is performed in real time in the processing subsystem of the device.

9. Recovery of the time signal by calculating the inverse Wavelet transform. This calculation is performed in real time in the processing subsystem of the device.

BRIEF DESCRIPTION OF THE DRAWINGS

For a better understanding of what is described in the present report, some drawings are included in which, by way of example, a list of the figures of the proposed invention is shown.

FIG. 8A shows a detail of the time evolution of the in the interval of FIG. 8A.

DETAILED DESCRIPTION OF THE EMBODIMENTS

Figure 1:
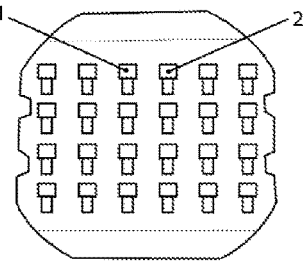
FIG. 1 shows an MQCM array showing two resonators, one used as a sensor (2) and the other as a reference (1).

The materials used in the manufacture of the invention, as well as the application procedures and all the accessory details that may arise, provided that they do not affect the essential nature of the invention, are given as an example of a preferred embodiment of the invention. This preferred mode of realization reflects the materialization and embodiment of the invention specifying details that help to understand it.

The proposed procedure and device improve the stability and limit of detection (LoD) of QCM sensors. Specifically, the procedure is based on the high degree of correlation between the acoustic resonators integrated in the same piezoelectric substrate (Monolithic Quartz Crystal Microbalance, MQCM). These resonators are of the High Fundamental Frequency Quartz Crystal Microbalance (HFFQCM) type and are mainly characterized by their mechanical robustness, high frequency and small size. Their implementation is based on inverted-table technology and their typical operating frequencies range from 30 MHz to 300 MHz. The typical surface area of these resonators ranges from 0.3 to 4 mm². One or more of the resonators, which we will call sensors, are in contact with the sample to be analyzed while others, which we will call references, are kept isolated from it. As can be seen in Graph 1 (b), when both resonators are subjected to similar environmental conditions (in this case flow velocity), there is a remarkable correlation in the derivatives of the approximation components of the sensor ($\hat{X}'_A(n)$) and the reference ($\hat{Y}'_A(n)$). In contrast, when a sample is injected into the sensor, the derivatives of the components differ as can be seen in Graph 1 (a). The basis of the proposed procedure is the elimination of the signal fraction common to the coefficients of the wavelet components of the signal and the reference, since these common variations will be due to unwanted external effects.

The proposed device has the ability to monitor the resonant frequency and losses (Quality factor) of the resonators (sensor and reference) from the measurement of their electrical admittance. Said device comprises:

- a mechanical and electronic interface where a monolithic array composed of a set of several QCM sensors can be easily inserted;
- a microfluidic system for dispensing the sample on the surface of the sensors and isolating the sample from the electrical contacts of the resonators;
- a frequency-determined signal source with high frequency stability and low phase noise that provides a signal between 1 and 300 MHz;
- a frequency synthesis subsystem;
- a multiplexing subsystem that allows the excitation/interrogation of a particular resonator of the array;
- a signal conditioning and acquisition subsystem;
- a thermal control subsystem that allows the temperature of the array to be varied between 0 and 70° C.

Likewise, the device has a control subsystem and a processing subsystem that allows the implementation in real time of all the algorithms and calculations described above.

Figure 2:
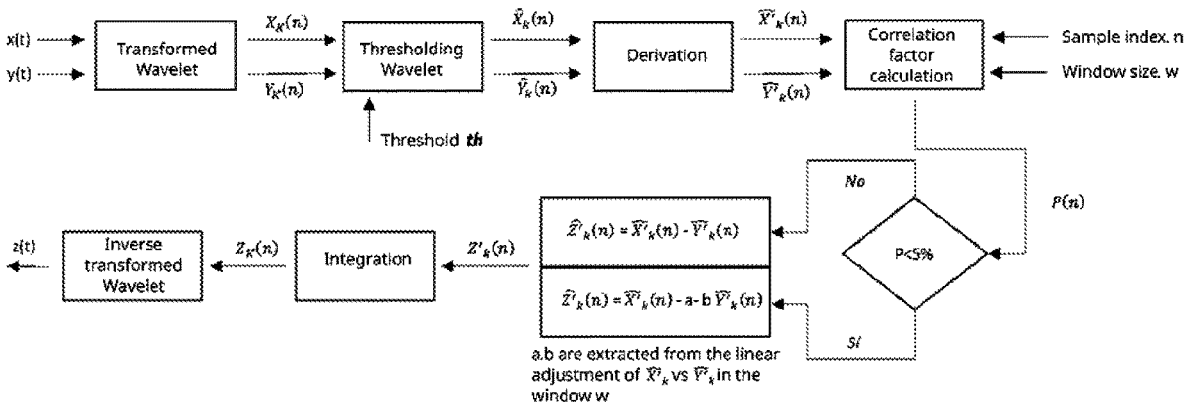
FIG. 2 shows a block diagram of the recommended procedure.

FIG. 2 shows an example of application of the procedure. The experiment consists of passing double distilled water with a controlled flow rate of 20 μl/min over the surface of two resonators (sensor and reference) integrated in a MQCM array with a nominal resonance frequency of 50 MHz. The surface of the resonators is made of gold and has been previously treated with a cleaning process based on the application of UV rays and ozone to remove possible impurities that may affect the baseline. The described device is used to monitor the experiment. This device is also used to control the sample flow rate and temperature in the array. To emulate the influence of external parameters the temperature of the device is modified as shown in graph 2 (c). In plot 2 (a) and plot 2 (b), the resonant frequency and dissipation are affected both in the sensor (plot with white circular markers) and in the reference (plot with black circular markers). When the proposed compensation procedure is applied, the result (trace with black square markers) is a much more stable signal, both at short and long integration times. To estimate the goodness of the procedure, a reference offset signal (trace with white triangular markers) has been included in the graph, which has been calculated by directly subtracting the signal at the sensor and at the reference, then averaged to eliminate noise. Note the waveform that behaves like a sawtooth between seconds 1000 and 2000. This effect is due to the intentional modification of the flow rate between 15 and 35 l/min. We can conclude that the frequency and dissipation signals measured in the sensor and reference resonators, although they have a high level of correlation in their time evolution, do not have an exact response in absolute value to external factors such as temperature and flow velocity. Under these conditions, the result provided by the proposed procedure is much better, both in terms of drift and high-frequency noise, than the reference method usually used in the state of the art based on subtracting the signals and averaging.

Figure 3A:
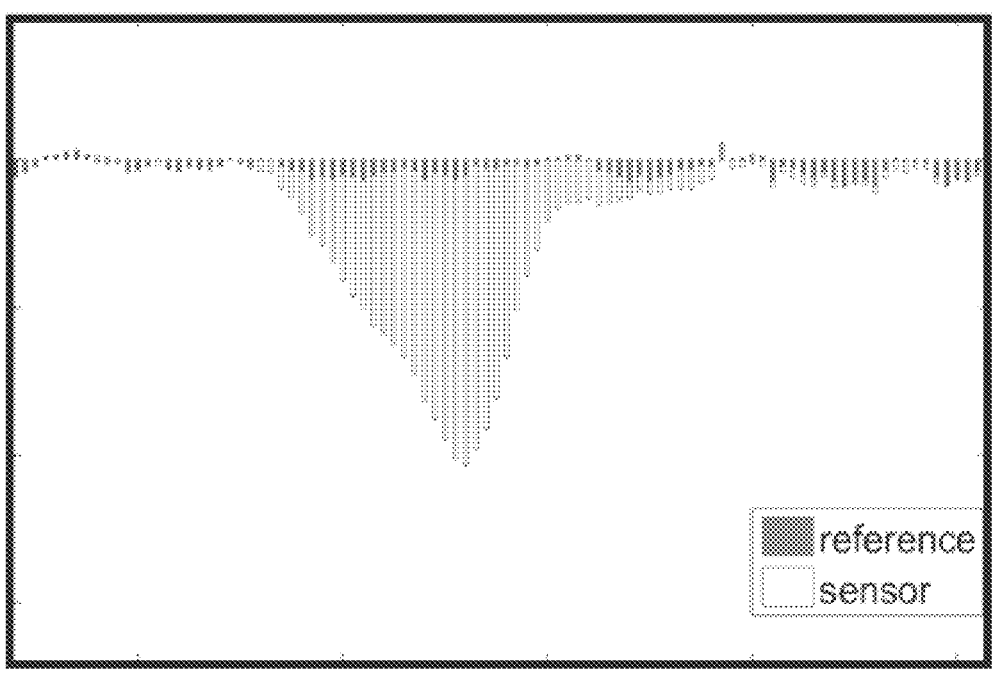
FIG. 3A shows a detail of an experiment showing the injection of the sample into the sensor, with a derivative of the approximation coefficient (CA) of the wavelet transform for the resonator acting as a sensor (light bars) and for the reference resonator (gray bars).
Figure 3B:
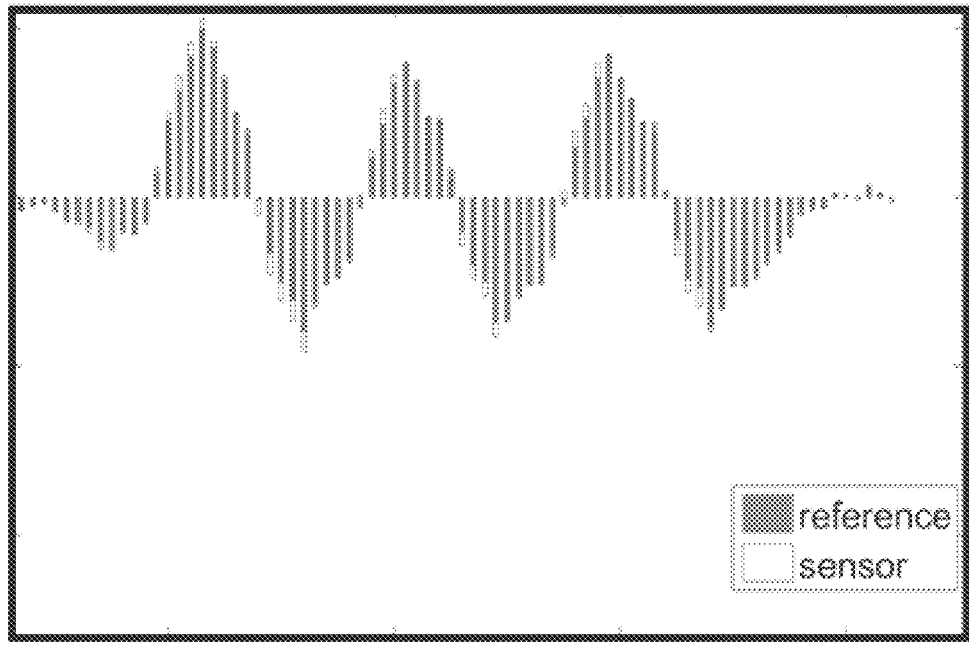
FIG. 3B shows a detail of the experiment showing a variation in the flow velocity in both the sensor and the reference resonator.
Figures 4A, 4B, 4C:
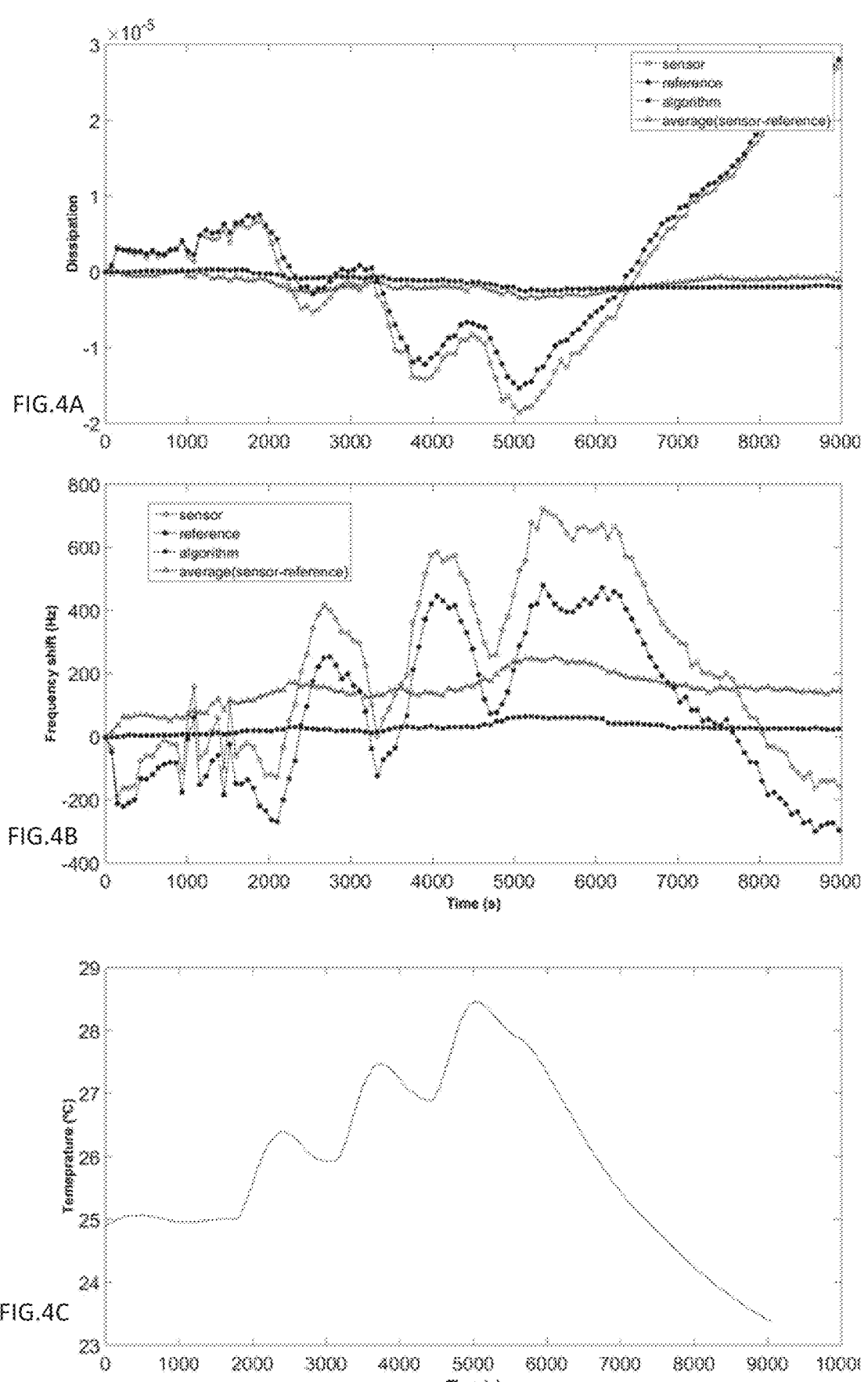
FIG. 4A shows time evolution of dissipation for the sensor, the reference, the subtraction of both and the signal provided by the proposed algorithm, for an experiment performed with bidistilled water by subjecting the array to change in temperature and flow velocity.
FIG. 4B shows time evolution of the resonance frequency for the sensor, the reference, the subtraction of both and the signal provided by the proposed algorithm for the experiment of FIG. 4A.
FIG. 4C shows the temperature during the experiment of FIG. 4A.
Figure 5A:
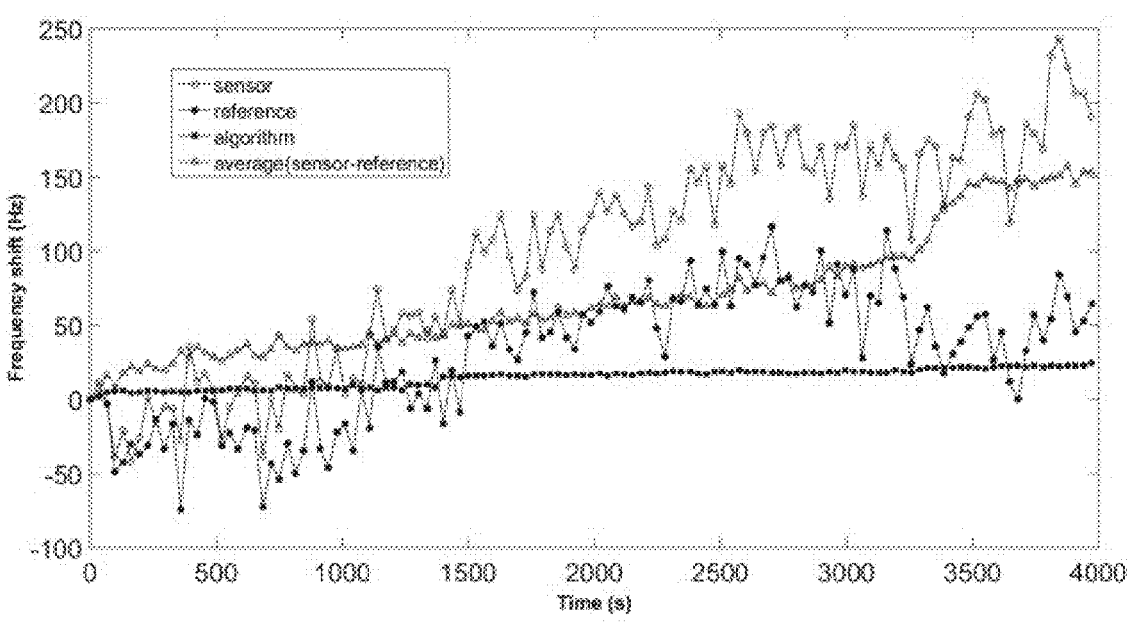
FIG. 5A shows time evolution of the resonance frequency for the sensor, the reference, the subtraction of both and the signal provided by the proposed algorithm when the array is under stable temperature conditions (25°) and flow rate equal to 0 μl/min.
Figure 5B:
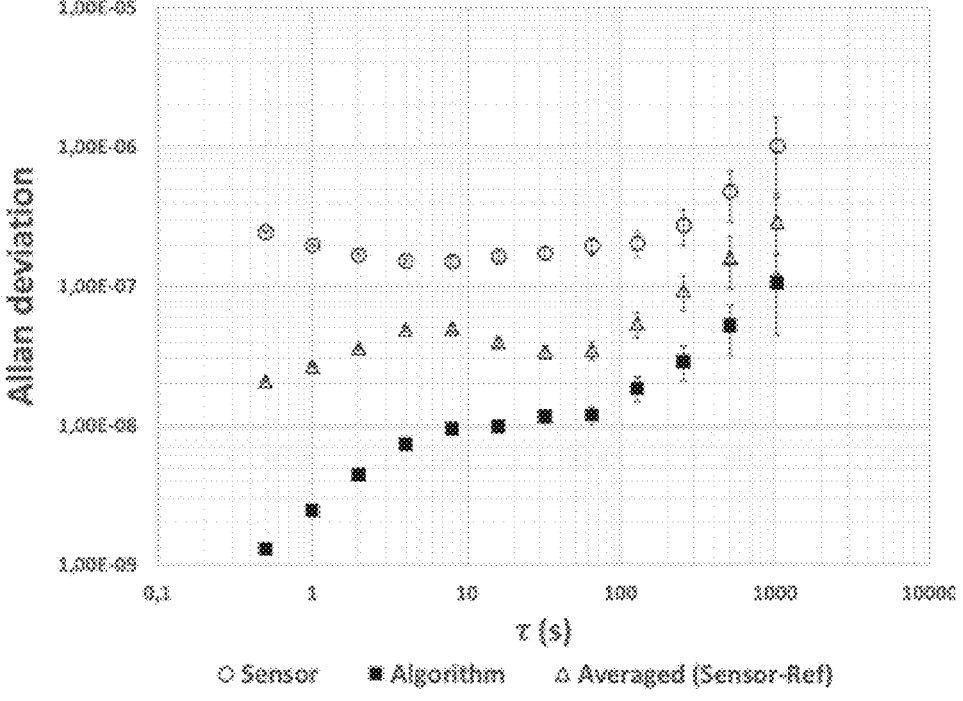
FIG. 5B shows frequency stability measured as Allan deviation.
Figures 6A, 6B, 6C:
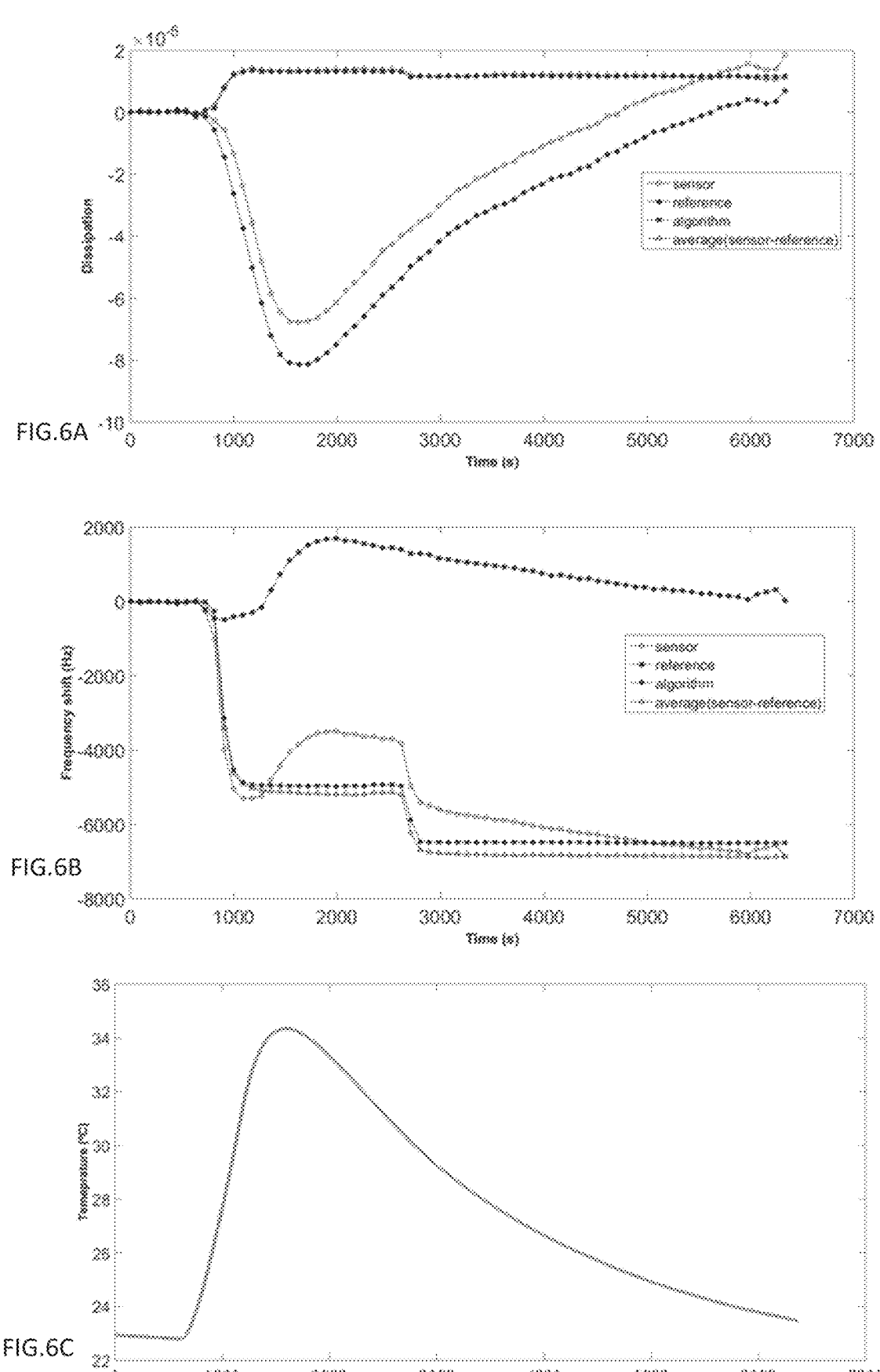
FIG. 6A shows time evolution of dissipation for the sensor, the reference, the subtraction of both and the signal provided by the proposed algorithm, for an experiment that consists of the injection of Neutravidin (NaV) with a concentration of 100 μg/ml and the subsequent injection of biotinylated BSA, also with a concentration of 100 μg/ml under changing temperature and flow rate conditions.
FIG. 6B shows time evolution of the resonance frequency for the sensor, the reference, the subtraction of both and the signal provided by the proposed algorithm for the experiment of FIG. 6A.
FIG. 6C shows the temperature during the experiment of FIG. 6A.
Figure 7:
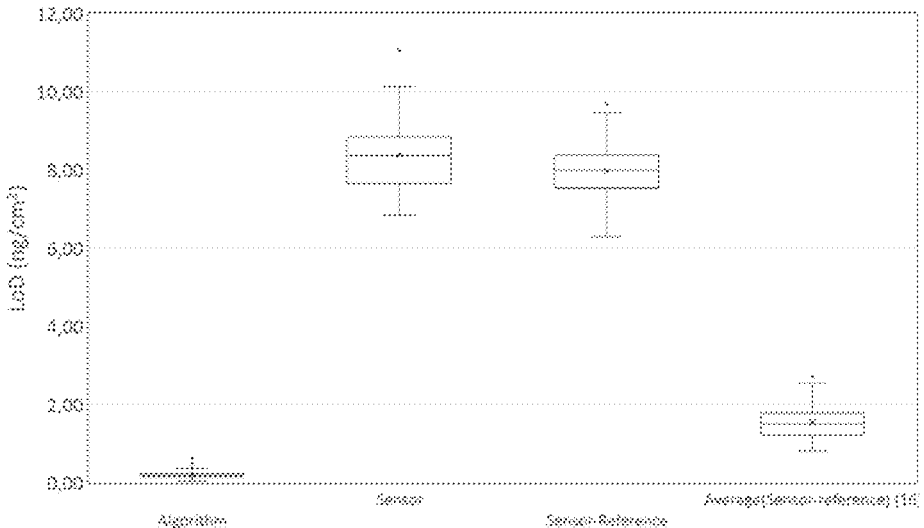
FIG. 7 shows the Limit of Detection (LoD) obtained with different methods.
Figure 8A:
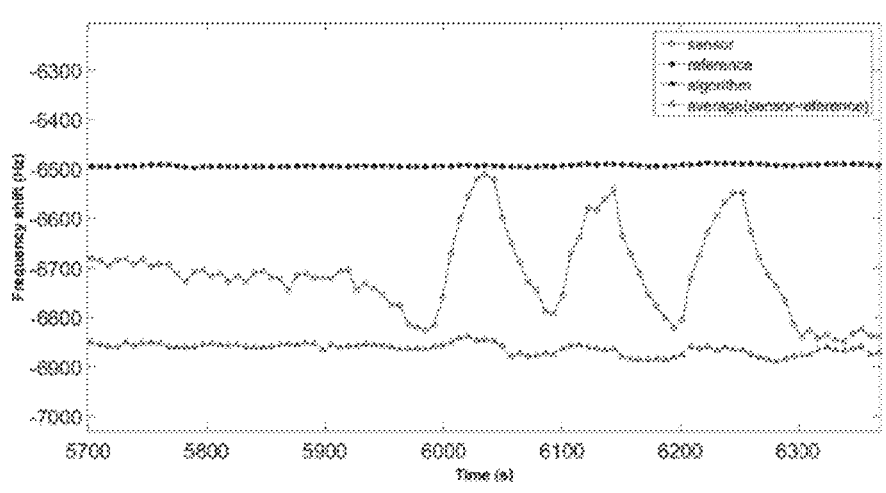
FIG. 8A shows a detail of the time evolution of the resonance frequency in the interval 5700 and 6400 seconds obtained in the experiment of FIG. 6, showing a detail of the signal where there is a change in the flow conditions, and showing the signals of the sensor, the reference, the subtraction of both and the signal provided by the proposed algorithm.
Figure 8B:
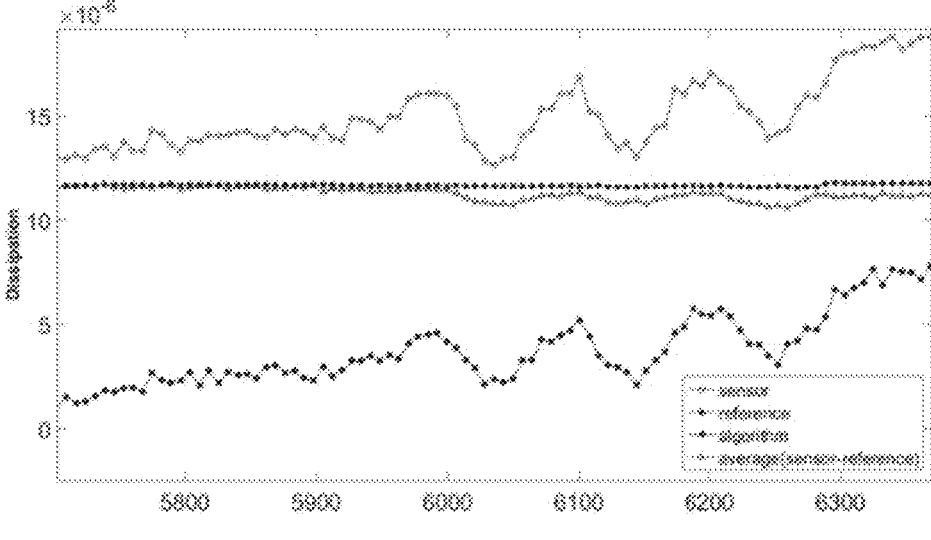

Another example of application is shown in FIG. 3. In this case, the experiment is designed to evaluate the generic detection limit of the method and consists of monitoring the resonance frequency of two resonators in contact with double-distilled water at a flow rate of 0 μl/min. The temperature of the device is set to remain constant at 25±0.05° C. In this scenario, only the intrinsic factors of the resonator and the effects of possible residual stresses in the measuring cell can affect the frequency stability. Graph 3 (a) shows the time evolution of the signals from the sensor (trace with white circular markers), the reference (trace with black circular markers), the result provided by the proposed compensation procedure (trace with black square markers) and a reference compensation signal (trace with white triangular markers), which has been calculated by directly subtracting the frequency at the sensor and the frequency at the reference, then averaging to eliminate noise. Plot 3 (b) shows the Allan deviation plot, commonly used to evaluate the frequency stability of resonators for different integration times (τ). Allan's deviation over the τ range from 0.5 to 1024 seconds has been calculated for the sensor, sensor-reference subtraction, reference compensation, and the proposed procedure. An improvement in stability is clearly seen for the entire τ range with respect to the original sensor signal, the subtraction and the alternative compensation method. Specifically, the stability improvement with respect to the original signal is 2 orders of magnitude, while it is about one order of magnitude with respect to the reference compensation method.

Graph 4 shows the detection limits calculated for the sensor, the sensor-reference subtraction, the reference compensation and the procedure proposed in the experiment described in the previous paragraph. The LoD has been calculated as three times the root mean square value of the frequency signal multiplied by the Sauerbrey constant for a 50 MHz resonator. To improve the statistical robustness of the calculation, the acquired signal (of one hour duration) was segmented into 100 intervals, the root mean square value of the LoD was calculated for each interval, and then the average and standard deviation were obtained using the 100 intervals. The detection limit obtained with the proposed procedure is 0.2 ng/cm2. The detection limit of the original signal is 8.38 ng/cm2 and the LoD offered by the reference compensation method is 1.56 ng/cm2. It is possible to conclude that the LoD of the proposed procedure is more than two orders of magnitude better than the original signal and more than one order of magnitude better than the reference correction.

Plots 5 (a) and (b) show the dissipation and resonance frequency monitored during another experiment designed to validate the procedure and device presented in this patent. In this case, the experiment consists of the consecutive injection of two protein samples through the sensor surface. The first injection consists of Neutravidin (NaV) at a concentration of 20 µg/ml and is performed at approximately 1000 s time instant. The second injection consists of biotinylated bovine serum albumin (biotinylated BSA), at a concentration of 20 µg/ml and is performed at approximately the time instant 3000 s. The experiment is performed in a saline medium with a controlled flow rate of 20 µl/min on the surface of both resonators (sensor and reference), except that the sample injection is only performed on the sensor. The surface of the resonators is made of gold and has been previously treated with a cleaning process based on the application of UV rays and ozone to remove possible impurities that may affect the baseline. The experiment is performed in an instrument that also allows to control the temperature in the array.

To emulate the influence of external parameters, the instrument temperature during NaV injection is modified as shown in plot 5 (c). As can be seen in plot 5 (a) and plot 5 (b), the dissipation and resonant frequency of the sensor (trace with white circular markers) are affected by the joint effect of temperature changes and sample injection, while the reference resonator (trace with black circular markers), is only affected by temperature variations. When the proposed compensation procedure is applied, the result (trace with black square markers) is a signal that eliminates the effects common to both resonators and therefore cancels the effect of temperature. In this case, the typical signal corresponding to a temperature-controlled protein adsorption assay can be seen. The reference method (trace with white triangular markers) based on direct subtraction and averaging also seems to work to eliminate large temperature variations if the two resonators have identical absolute temperature response. However, when the responses to the external phenomena we wish to compensate for are not exactly equal, the effectiveness of the traditional method decreases. To illustrate this situation, we have slightly modified the flow velocity around the time instant 6000 s between 15 and 35 µl/min. This modification results in a sawtooth interference affecting both resonators. However, being in different flow channels, the interference is highly correlated but not identical. Graph 6 shows a detail of the same experiment previously presented in graph 5, in the time interval between 5700 and 6400 seconds, where this effect is clearly seen. In this case the proposed procedure adequately corrects the effects of the variation in flow velocity, while the reference method fails to do so.

The invention claimed is:

1. A method for improving the stability and detection limit of acoustic wave sensors, comprising:

a) monitoring, with a sampling period of between 0.01 and 1 second, a resonance frequency and dissipation of two piezoelectric resonators integrated in a same substrate, wherein one piezoelectric resonator acts as a sensor while the other piezoelectric resonator acts as a reference and storing in memory the sampling data;

b) injecting a sample on a surface of the piezoelectric resonator that acts as the sensor with a flow rate between 1 and 200 µl/min;

c) applying a Daubechies Wavelet transform to signals acquired in a) and storing the data in memory;

d) applying a process in which all wavelet components obtained in c) whose magnitude is lower than a certain threshold, Th, are properly filtered and their data is stored in memory;

e) performing a numerical calculation of a time derivative of the wavelet transform components of the two resonators obtained in d) and storing the results in memory;

f) calculating a cross-correlation coefficient between each sample n of the derivative of the wavelet transform components of the sensor signal and the reference obtained in e), wherein this calculation is performed in a window of length w samples, and storing the results in memory;

g) calculate a new corrected time derivative of the wavelet transform components of the sensor resonator from the coefficients obtained in section f), whose calculation depends on the obtained value of the correlation coefficient as follows:

when the calculated coefficient indicates a high probability of correlation of $P<5\%$, the derivative in the window is calculated by minimizing the error in the linear fit between the coefficients of the derivative of the original wavelet components of the sensor and the reference;

when the calculated correlation coefficient does not indicate a high probability of correlation of $P>5\%$, the derivative in the window is calculated by subtracting the coefficients from the derivative of the original wavelet components of the sensor and the reference; and storing the results of this calculation in memory;

h) reconstructing the wavelet coefficients of the resonance frequency and dissipation of the resonator acting as the sensor by numerical integration of the data obtained in g), and keeping the result of the integration in memory;

i) generating a corrected time signal of the resonance frequency and dissipation of the sensor by calculating an inverse wavelet transform of the data obtained in h).

2. The method for improving the stability and detection limit of acoustic wave sensors according to claim 1, further comprising:

simultaneously monitoring responses of several resonators integrated in an array, wherein all resonators act as sensors except for one resonator that functions as a reference.

3. The method for improving the stability and detection limit of acoustic wave sensors according to claim 1, further comprising:

simultaneously monitoring responses of several resonators integrated in an array, wherein the resonators are arranged in pairs, wherein one member of the pair acts as a sensor and the other as a reference.

4. The method for improving the stability and detection limit of acoustic wave sensors according to claim 1, wherein the piezoelectric resonator is a thin film acoustic resonator.

5. The method for improving the stability and detection limit of acoustic wave sensors according to claim 1, wherein the piezoelectric resonator is a resonator vibrating in shear mode.

6. The method for improving the stability and detection limit of acoustic wave sensors according to claim 1, wherein the piezoelectric resonator is a High Fundamental Frequency Quartz Crystal Microbalance (HFFQCM) sensor with a resonance frequency between 30 MHz and 300 MHz.

7. A device implementing the method of claim 1, comprising:

a mechanical and electronic interface where a monolithic array composed of a set of several QCM sensors is inserted;

a microfluidic system that dispenses the sample on a surface of the sensors and isolates the sample from the electrical contacts of the resonators;

a frequency-determined signal source with high frequency stability and low phase noise that provides a signal between 1 and 300 MHz;

a frequency synthesis subsystem;

a multiplexing subsystem that allows for excitation/interrogation of a specific resonator of the array;

a signal conditioning and acquisition subsystem;

a thermal control subsystem that allows a temperature of the array to be varied between 0 and 70° C.;

a control subsystem based on use of digital integrated circuits that allows coordinated control of different subsystems that make up the device; and a processing subsystem comprising a floating-point calculation unit and at least one memory unit for storing the calculation results, wherein the subsystem calculates the dynamic series frequency and the dissipation factor of the piezoelectric resonator being interrogated from the data provided by the acquisition subsystem.

* * * * *